United States Patent [19]

Szoke

[11] 4,119,509

[45] Oct. 10, 1978

[54] METHOD AND APPARATUS FOR ISOTOPE SEPARATION FROM A GAS STREAM

[75] Inventor: Abraham Szoke, Boulder, Colo.

[73] Assignee: Massachusetts Institute of Technology, Cambridge, Mass.

[21] Appl. No.: 695,232

[22] Filed: Jun. 11, 1976

[51] Int. Cl.² .......................... B01J 1/10; B01K 1/00
[52] U.S. Cl. .................. 204/157.1 R; 204/DIG. 11; 250/527
[58] Field of Search ................ 204/DIG. 11, 157.1 R, 204/158; 250/527

[56] References Cited

U.S. PATENT DOCUMENTS 3,558,877  1/1971  Pressman ................ 204/DIG. 11

Primary Examiner—Howard S. Williams
Attorney, Agent, or Firm—Arthur A. Smith, Jr.; Martin M. Santa

[57] ABSTRACT

This invention relates to a method and apparatus for isotope separation and in particular to separating the desired isotope from the gas in which it is contained by irradiating it with a laser and thereby selectively providing kinetic energy to the isotope through inelastic events, monomolecular or bimolecular, in order to cause it to segregate within or fly out of the gas stream in which it is contained.

32 Claims, 6 Drawing Figures

METHOD AND APPARATUS FOR ISOTOPE SEPARATION FROM A GAS STREAM

BACKGROUND OF THE INVENTION

Many methods of laser isotope separation have been proposed in the literature recently. The main criteria for successful separation and good yield are: first, initial selectivity which means a spectrum with a well-defined isotope shift; and second, conservation of the initial selectivity in the subsequent stages of separation. The main methods, which have been proposed and carried out to some extent so far are: (1) Selective photoexcitation of atoms, followed by chemical reaction or by photoionization and electrostatic or magnetic separation of the ions. (2) Selective photoexcitation of molecules followed by dissociation (one step predissociation), speeded-up chemical reaction, and photodissociation or photoionization by a second photon. (3) Physical separation by selective beam-pushing by photons. Method (1) has the practical problems of the high cost of making atomic beams. Throughput using method (1) or method (3) is quite low. Molecular methods are more advantageous from the point of view of throughput and the energy needed to form the beam. Photodissociation usually produces reactive fragments which then can destroy selectivity through secondary reactions. Reaction rates usually compete with intermolecular relaxation and photodissociation competes with photoionization in molecules.

Supersonic nozzle beams have been studied over many years; they operate in a collisionless regime. The main practical problem with them is the high pumping rate required. According to Fenn et al, Adv. Chem. Phys. 10, 275 (1966), the origin of the problem is in the nozzle, where, because of the low Reynolds number, there is no adiabatic core left. Therefore, the emerging beam has to be skimmed; further, the beam cannot be passed through a diffuser for high-pressure pumping. Two recent proposals discuss the use of supersonic nozzles in isotope separation without the use of lasers [C. A. Wang, Nature 253, 260 (1975); J. B. Anderson, P. Davidovits, Science 187, 642 (1975)]. Another well-documented method for physical separation of isotopes in supersonic flow is the Becker nozzle process [Becker et al, Angew. Chem. Int. Ed. Engl. 6, 507 (1967)].

SUMMARY OF THE INVENTION

The invention provides various techniques for the separation of isotopes in the vapor phase, by selective excitation of an isotope in a gas stream followed by physical separation of the isotope from the remainder of the gas. The gas flow may be subsonic or supersonic, and the gas may be a pure gas or a mixture of gases. The selective excitation of an isotope may be accomplished by one laser to provide vibrational excitation, electronic excitation, or photopredissociation. Alternatively, the selective excitation of the isotope may be obtained by using two lasers or one laser plus a continuous source. These latter means of selective excitation provide electronic or vibrational excitation of the isotope to an excited energy level or they provide a two-step photodissociation or photopredissociation of the isotope. The physical separation of the isotope from the pure gas or from the carrier mixed with the pure gas is achieved, for the case of electronic and vibrational excitation, by inelastic collisions of the excited isotope with the carrier gas. For the case of photodissociation or photopredissociation, the isotope has sufficient kinetic energy to accomplish the physical separation without the need for inelastic collisions.

It is therefore a primary object of this invention to provide an improved method of and apparatus for isotope separation which has a high throughput and which is relatively inexpensive and efficient when compared with known methods and apparatus for isotope separation.

The novel features that are considered characteristic of the present invention are set forth in the appended claims; the invention itself, however, both as to its organization and method of operation together with additional objects and advantages thereof will best be understood by not only the preceding but also the following description of a preferred embodiment when read in conjunction with accompanying figures in which:

FIG. 1 is a perspective partial cross section of a supersonic nozzle embodiment of the invention.

FIGS. 2, 3, and 6 show different excitation sources used in different embodiments of the invention.

DETAILED DESCRIPTION OF INVENTION

This invention applies a combination of three basic facts: (1) Lasers excite internal degrees of freedom of molecules very efficiently and selectively. (2) A part of this internal excitation is readily and efficiently converted into kinetic energy by strong chemical forces: molecular dissociation, chemical reactions and inelastic collisions. (3) Molecules and atoms can be made into highly-collimated streams in laminar flow and also by passing through supersonic nozzles; these flows are translationally and vibrationally cold, the thermal velocity being a fraction of the beam velocity.

Figure 1:
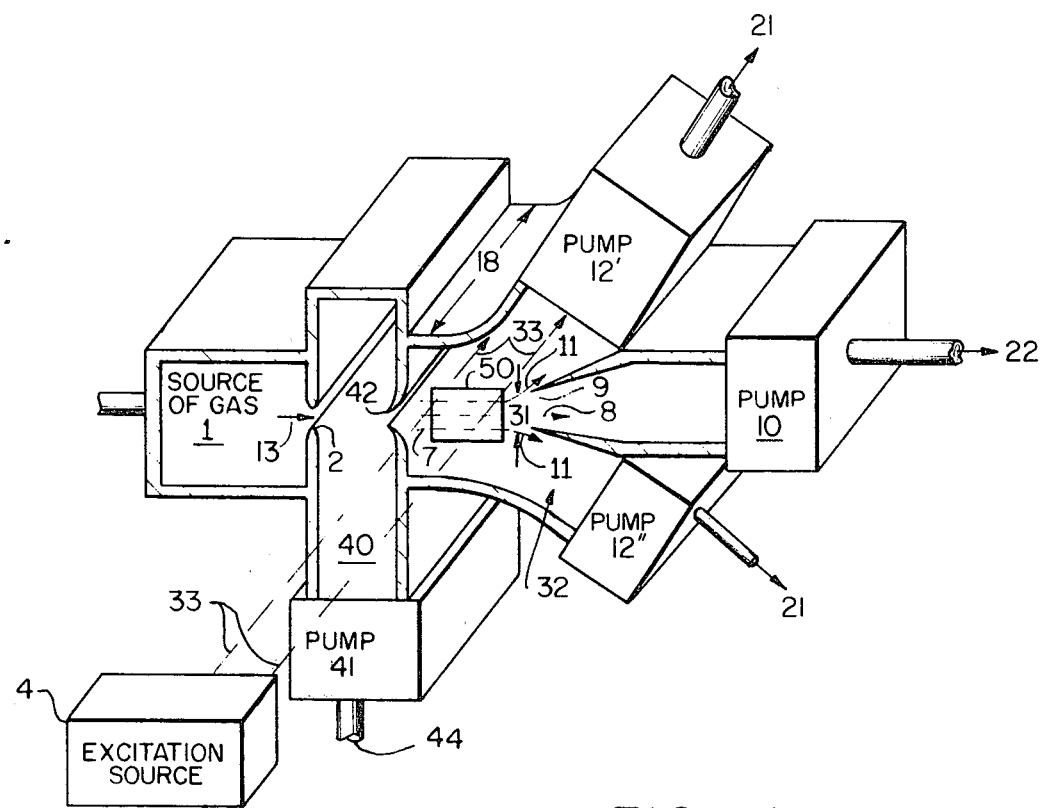
Figure 2:
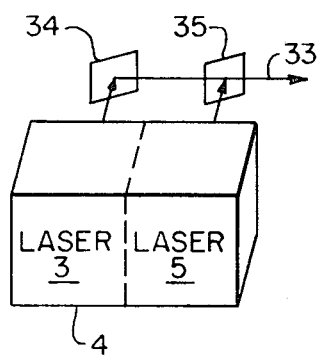

In one preferred embodiment of this invention, shown in FIG. 1, volatile molecules from a source 1 are passed through a supersonic nozzle 2 where they are cooled translationally and also in some of their internal degrees of freedom; the molecules pass into a pump chamber 40 and are pumped by a pump 41. The center of the beam is skimmed by a skimmer 42, and those molecules that pass are collimated and move with substantially uniform velocity. The density of the resulting molecular stream 7 is such that the width 31 of the stream 7 containing the isotope is of the order of the mean free path of the molecule, while, preferably, its depth 18 is measured in the direction of radiant energy from a source 4 is significantly larger, being approximately the distance across the nozzle 2 for maximum absorption of energy from the source 4. The molecules containing the isotope of interest are selectively excited by radiation 33 from a laser 3 of a narrowband frequency corresponding to the first vibrational state of said molecule. The laser 3 of FIG. 2 is contained in the excitation source 4. A second laser 5, also contained in the source 4, collimated with the first laser with the aid of a mirror 34 and a dichroic beam splitter 35, excites these vibrationally excited molecules into a dissociative or predissociative level. A window 50 in the supersonic velocity region 32 of nozzle 2 allows the radiation 33 from source 4 to enter the nozzle 2. The frequency of laser 5 corresponds to the energy difference between these levels.

Figure 3:
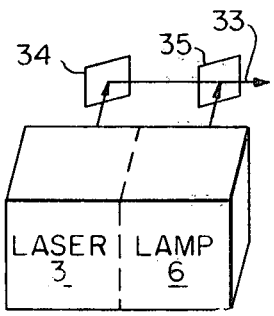

Alternatively, a high-intensity incoherent lamp can be used for this second excitation into a photodissociation continuum. An energy-transfer lamp 6 of the second excitation wavelength, for instance, a lamp containing $Ar + N_2 + NO$ or $Xe + Hg$, is very efficient. Lamp 6 is shown as the second excitation source in FIG. 3.

During the process of dissociation, the strong electron-nuclear coupling transfers a part of the internal energy of the molecule into kinetic energy of the fragments. The velocity of the fragments is usually not mono directional, but it is significantly larger than the thermal velocity of the stream 7 so that a large fraction of the fragments fly out of the stream. The undeflected stream 8 is caught in a beam trap 9 (diffusor) and pumped away by pump 10, while the fragments 11 typically fly out and can be collected separately by pump 12. The great advantages of the method and apparatus of this invention over the others that have been published are that it has a higher throughput and it does not suffer from the problems of reactive radicals, as the radicals are physically removed from the undeflected stream.

Figure 4:
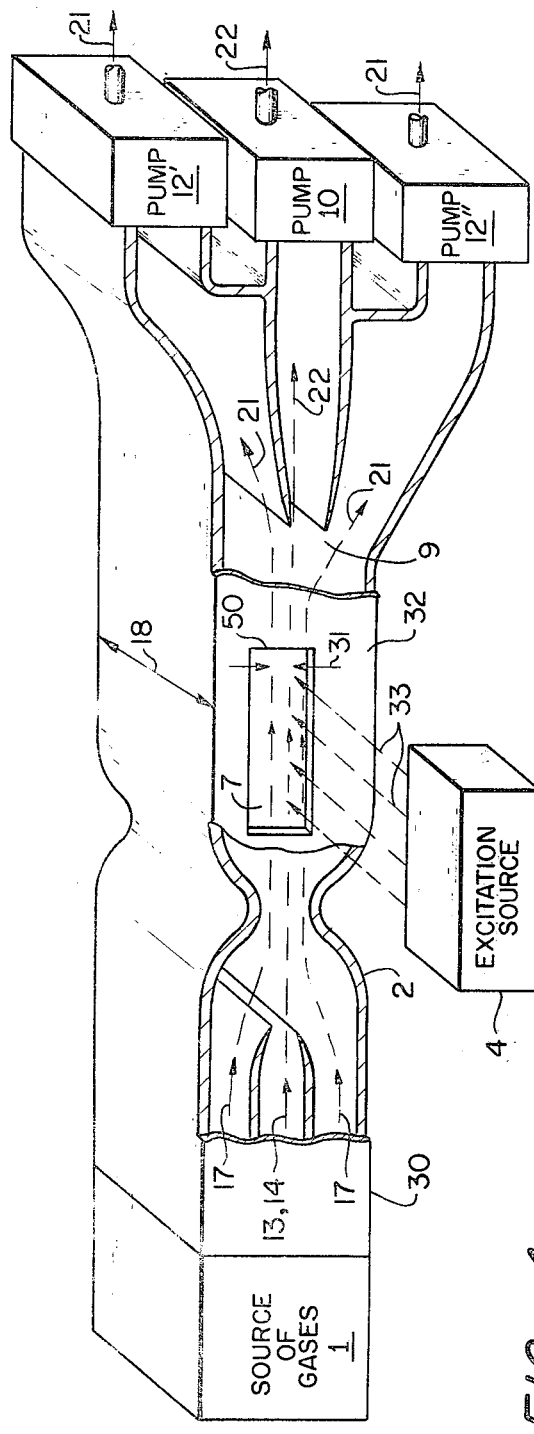
FIG. 4 is a perspective partial cross section of a carrier-gas-supported supersonic-nozzle embodiment of the invention.

This invention, in another preferred embodiment of FIG. 4, ameliorates the prior art problems with supersonic nozzle streams by a device which can be called a "gas-dynamically supported" supersonic stream. The apparatus, shown in FIG. 4, is based on laminar flow. The gas 13, typically $SF_6$ or $UF_6$, whose isotopes are to be separated, may but need not be also mixed with another gas 14, typically He or Ar, and the mixture flows between two regions of buffer gas 17, typically He or Ar, which need not be 15, 16 or buffer gas 17, typically He or Ar, which need not be the same as gas 14. The width 31 of the gas 13 stream, (or the mixture of gases 13, 14) is comparable to the mean free path in the supersonic region. In the passage of the streams through the supersonic nozzle 2, the Reynolds number is large; therefore the gas mixture 13, 14 becomes adiabatic. The gas 13 and 14 and the gas 17 are chosen so that they have the same average adiabatic coefficient in order to ensure laminar flow. The carrier gas 17 prevents the gas 13, 14 in the core from striking the wall and becoming heated thereby. The separation of gas 13, 14 by excitation source 4 can be performed in any of the ways indicated previously in this specification. After the supersonic region, the flow of gas goes through a diffusor 9, and the gases 21, 22 are pumped away separately.

Gas 21 is primarily composed of gas 17 but also contains gas 13' (or the mixture of gases 13', 14), where gas 13' has a greater fraction of the excited isotope than was contained in the input gas 13. Gas 22 contains gases 13" and 14 principally, where the gas 13" contains less of the excited isotope than was contained in the input gas 13. The diffusor section 9 of FIG. 4 comprises two straight edges which extend across the duct 30. The edges 24 form weak shocks that extend to the top and bottom walls 25 of duct 30 and thereby reduce the speed of the gas flow to subsonic. The increase in gas pressure by the subsonic flow of gases 21, 22 reduces the required pumping capacity and power required by pumps 10, 12 and thus contributes to making the isotope separation process of this invention more efficient.

Figure 5:
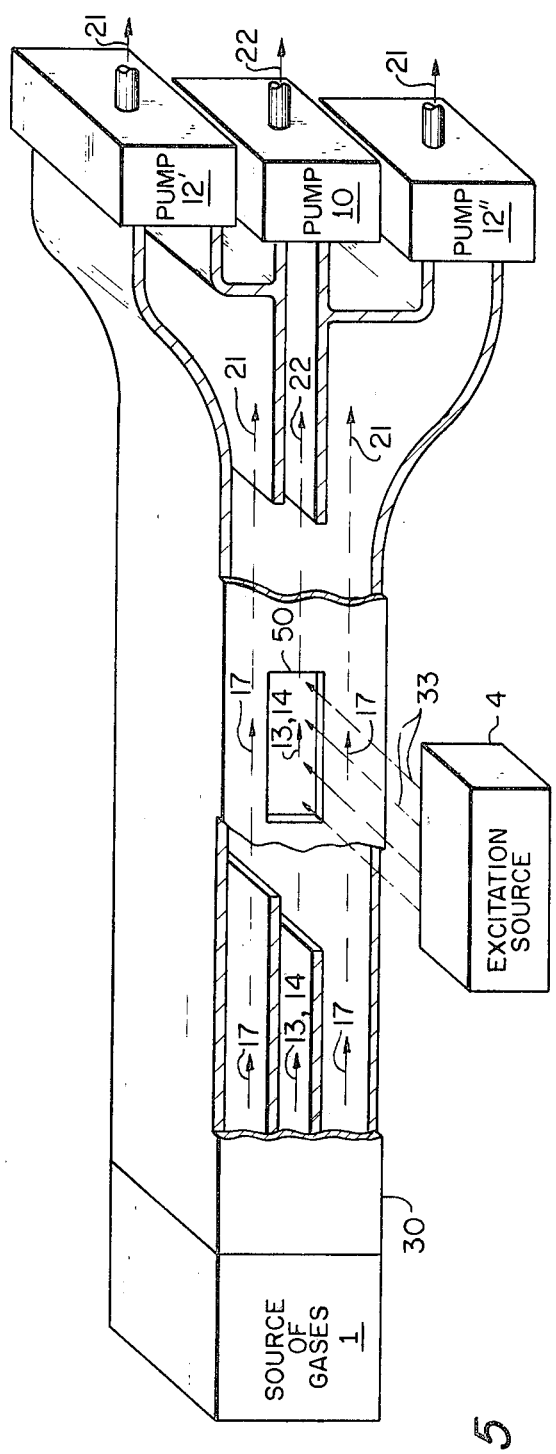
FIG. 5 is a perspective of a subsonic embodiment of this invention.

The methods for separating a carrier gas 17 from an isotope of a different gas 13 are well known to those skilled in the art. The book Nuclear Chemical Engineering, Benedict and Pigford describes specific techniques for separation.

Where the gases 13, 14, 17 are sufficiently cool for the selective excitation of gas 13, simple laminar flow can be used, as seen in the structure depicted in FIG. 5. This apparatus and method is similar to FIG. 4, but without the supersonic nozzle. The use of subsonic apparatus results in smaller pressure drops from the input to the output, therefore lower pumping cost compared to the supersonic version. Also, the apparatus is simpler and cheaper. Both embodiments can be thought of as a variant of a "wall-less" diffusion apparatus, or as a "straight flow" gas centrifuge. In both cases, the selective excitation of one species by the laser and subsequent conversion of this internal energy into kinetic energy is central to the method.

In the following, variations of the method and apparatus of this invention are illustrated by specific examples.

Figure 6:
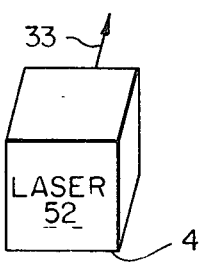

One of the simplest systems is $H_2CO$, for which Yeung et al, Applied Phys. Letters 21, p. 109, 1972; J. Chem. Phys. 58, p. 3988, 1973 have shown that one step selective photo-predissociation by a frequency-doubled ruby laser or a dye laser 52 as in the excitation source 4 of FIG. 6, can dissociate the HDCO isotope selectively. This process can be carried out in one of the preferred embodiments of FIGS. 1, 4 and 5, as described above, where the excitation source is shown in FIG. 6. Similarly, $Br_2$ photodissociation using similar lasers can be provided in a stream, thus eliminating the problem of secondary reactions of the free atoms experienced by Leone et al, Phys. Rev. Letters 33, p. 269, 1974.

Similarly, a $CO_2$ laser can be used to excite a stream of $NH_3$, exciting the $^{15}NH_3$ selectively, then photodissociating it with a 2200 A radiation, in a process similar to that of Letokhov et al, JETP Letters 15, p. 501, 1972; JETP Letters 17, p. 63, 1973, but carried out in a supersonic stream as in FIGS. 1, 4 or a subsonic stream as in FIG. 5. The free radical reactions do not interfere with the separation process, and a high selectivity is expected. Similar procedures can be carried out in $SF_6$ and $UF_6$. $SF_6$ can be excited in an isotopically selective way by single or multiphoton absorption using an appropriately tuned $CO_2$ laser. When said laser is powerful enough, it dissociates $SF_6$ by itself. Alternatively, the laser can be used in conjunction with a UV light source to achieve dissociation. In $UF_6$, the first laser can be a $16\mu$ laser of appropriate wavelength (or $12\mu$ or $8\mu$, see e.g. C. P. Robinson, invited talk in New York Meeting of the American Phys. Society, 1976). In these molecules the free radicals formed are very reactive and their removal most probably presents a formidable obstacle to efficient isotope separation.

Thus far this specification has elaborated on existing methods, with a view to making them more practical. It should be understood that techniques of adiabatic passage, and two-photon line narrowing can be used in order to narrow the excitation line even further, if needed. The methods described in the following paragraphs are specific to supersonic beams with or without gas support, or to the laminar flow system, all described earlier in this specification, and they show the general applicability of these methods. Consider an atomic or molecular nozzle beam that contains a mixture of several atomic or molecular species, one of them containing the isotope to be separated, the other being a reactive species or a buffer gas. The molecule containing the isotope is electronically or vibrationally excited. There are many ways this internal energy can be transferred to relative motion in an inelastic collision, imparting kinetic energy to the participating molecules, and causing them to separate. The underlying physics of this method is more complicated than the unimolecular decomposition but it is richer in its possibilities and it is potentially much more efficient. These possibilities will be illustrated by concrete examples.

Electronic excitation of an atomic state can give a highly reactive species. For example, it is well known that the quenching of Ar(3p) metastables by other atoms and molecules proceeds at rates that are gas-kinetic and higher. If the reaction is exoergic (as it is in most cases) the products of the reaction have a large kinetic energy which can be used to enable the fragments to separate from the main flow. Another example is the alkali-noble gas molecule, studied extensively by Gallagher. When the alkali atom (e.g., Na) is raised to its first excited state ($4s^2S$) from its ground state ($3p^2P$) it forms a relatively strong molecular bond with a noble gas (e.g., Ar), called an excimer. When this excimer radiates and decays to its ground state, it dissociates and the atoms emerge with large kinetic energy. The method of separation thus consists of exciting the desired isotopic atom ($^{21}N_a$, $^{235}U$ or whatever) to a suitable excited level using a visible dye laser and letting it collide inelastically with another atomic or molecular species, as described above, thereby transfering part of its internal energy into kinetic energy or, alternatively, forming an excimer that transfers part of its internal energy into kinetic energy when the excimer emits a photon and decays to its ground state.

Molecules can be excited electronically and caused to dissociate collisionally in the beam, e.g., $Br_2$. As an alternative, electronically excited molecules can scatter inelastically by any number of reactive species. Any specie which quenches the fluorescense readily is a good candidate since only a very small fraction of the excitation energy is needed for the molecules to segregate. Cross sections of these processes can be large: $NO(A^3\Sigma^+_u)$ for example is quenched by NO with almost kinetic rates. Another example is the $Br_2 + HI$ system studied by Leone and Moore, Phys. Rev. Letters, Vol. 33, No. 5, July, 1974.

Potentially even more useful systems are vibrationally excited molecules. These show large isotope shifts, of the order of $\frac{1}{2}$ ($\Delta m/m$), and their lifetime is in the millisecond range. Also, there are very efficient high-power lasers in the infrared, and the initial photon has a low energy. The simplest scheme is the conversion of vibrational energy into kinetic energy by vibrational transfer to another molecule (asymmetric V-V process) or by the vibrational quenching of the first molecule by another molecule or an atom in a collision (V-T process). An "energy gap" law is roughly obeyed; therefore, with the proper choice of relaxer molecule a few kT of kinetic energy can be transferred in 10-100 collisions which sets a low limit of $\sim 10^2-10^3$ on the ratio of beam width to length of the stream. A good system is, for example, $HBr(v=1) + HI$ or the HF-HF collisions. Also polyatomic molecules have large deactivation cross sections. Cross sections are even larger for reactive or possibly reactive collisions with atoms. For example $HCl(v = 1) + 0$, which has been studied by Karni et al (Phys. Letters 35, p. 100, 1975), proceeds four orders of magnitude faster than in the ground state, with almost kinetic cross sections. For the purpose of this invention, it is immaterial whether the collision is reactive, ($HCl(v = 1) + 0$) → immaterial whether the collision is reactive, (such as $HCl(v=1) + 0 \to OH +$ Cl), or not, ($HCL(v=1) 0 \to HCl(v=0) + 0$); large fact, observing the reaction in a mixed beam and exciting it with a pulsed HC$l$ laser, the actual branching ratio can be measured. In some other systems such as HF, it is not yet known what fraction of the vibrational energy passes into translation; this method can measure that fraction also.

The various features and advantages of the invention are thought to be clear from the foregoing description. Various other features and advanntages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. A method for the separation of isotopes of a material comprising a first isotope and a second isotope comprising the steps of:
   a. forming a stream of vapor containing said isotopes, said vapor having a velocity in the direction of said stream;
   b. selectively exciting one of said isotopes by exposing said vapor to radiation at a predetermined wavelength without substantially exciting the second isotope;
   c. causing the excited first isotope to undergo at least one of the processes of molecular dissociation, chemical reaction and inelastic collision with another particle while this first excited isotope is still excited, whereby this first isotope acquires an excess velocity component transverse to the velocity of the stream; and
   d. separating the vapor containing the isotope energized in step (c) from the gas remaining in the stream, after a sufficient time to allow the energized isotope to be substantially segregated from the stream by its excess transverse velocity.

2. The method as defined in claim 1 wherein the isotopes are atoms.

3. The method as defined in claim 2 wherein the isotope atoms are mixed with a vapor of chemically different composition and the forces in step (c) are acting between said vapor and the excited isotope.

4. The method as defined in claim 1 wherein each isotope is contained in a molecule.

5. The method as defined in claim 4 wherein the chemical forces of step (c) are acting within parts of an isotope molecule causing it to dissociate.

6. The method as defined in claim 5 wherein the isotope molecule is mixed with a vapor of chemically different composition.

7. The method as defined in claim 4 wherein the isotope molecules are mixed with a vapor of chemically different composition and the forces in step (c) are acting between said vapor and the excited isotope molecule.

8. A method for the separation of isotopes of a material containing a first isotope and a second isotope comprising the steps of:
   a. forming a first stream of vapor containing said isotopes, said vapor having a velocity in the direction of said stream characterised as first vapor;
   b. surrounding said first stream with a second vapor having similar velocity and in the same direction as said first vapor and having laminar flow with respect to said first vapor to form a second stream, both streams being contained in a duct;

c. selectively exciting one of said isotopes by exposing said vapor to radiation at a predetermined wavelength without substantially exciting the second isotope;

d. providing the isotope that is selectively excited with an excess velocity component transverse to the velocity of said stream by the action of chemical forces;

e. separating said first stream from the surrounding second stream now containing a substantial fraction of the separated isotopes of said first stream.

9. The method as defined in claim 8 wherein the isotopes are atoms.

10. The method as defined in claim 9 wherein the chemical forces of step (d) are acting within parts of an isotope molecule causing it to dissociate.

11. The method as defined in claim 10 wherein the isotope molecule is mixed with a vapor of chemically different composition.

12. The method as defined in claim 9 wherein the isotope atoms are mixed with a vapor of chemically different composition and the forces in step (d) are acting between said vapor and the excited isotope.

13. The method as defined in claim 8 wherein each isotope is contained in a molecule.

14. The method as defined in claim 13 wherein the isotope molecules are mixed with a vapor of chemically different composition and the forces in step (d) are acting between said vapor and the excited isotope molecule.

15. A method for the separation of isotopes of a material containing a first isotope and a second isotope comprising the steps of:

a. forming a first stream of vapor containing said isotopes, said vapor having a velocity in the direction of said stream, characterised as first vapor;

b. surrounding said first stream with a second vapor having similar velocity and in the same direction as said first vapor and having laminar flow with respect to said first vapor to form a second stream, both streams being contained in a duct;

c. passing said first and second vapor through a supersonic nozzle to accelerate them to supersonic velocities and thereby providing a highly collimated, translationally cold first vapor while also preserving its laminar flow with respect to the second vapor;

d. selectively exciting one of said isotopes by exposing said vapor to radiation at a predetermined wavelength without substantially exciting the second isotope;

e. providing the excited isotope with an excess velocity component transverse to the velocity of said stream by the action of chemical forces;

f. passing the streams through a diffusor that reduces the velocity of the two streams to subsonic velocities and is so constructed that it separates the first stream from the surrounding stream specified in (b), now containing a substantial fraction of the separated isotope.

16. The method defined in claim 15 wherein after passing the supersonic nozzle as specified in (c) and before passing the diffusor as specified in (f) the streams are free flowing.

17. The method as defined in claim 16 wherein the isotopes are atoms.

18. The method as defined in claim 17 wherein the isotope atoms are mixed with a vapor of chemically different composition and the forces in step (e) are acting between said vapor and the excited isotope.

19. The method as defined in claim 16 wherein each isotope is contained in a molecule.

20. The method as defined in claim 19 wherein the chemical forces of step (e) are acting within parts of an isotope molecule causing it to dissociate.

21. The method as defined in claim 20 wherein the isotope molecule is mixed with a vapor of chemically different composition.

22. The method as defined in claim 19 wherein the isotope molecules are mixed with a vapor of chemically different composition and the forces in step (e) are acting between said vapor and the excited isotope molecule.

23. The method as defined in claim 15 wherein the streams pass through ducts during the whole process.

24. The method as defined in claim 23 wherein each isotope is contained in a molecule.

25. The method as defined in claim 23 wherein the chemical forces of step (e) are acting within parts of an isotope molecule causing it to dissociate.

26. The method as defined in claim 25 wherein the isotope molecule is mixed with a vapor of chemically different composition.

27. The method as defined in claim 19 wherein the isotope molecules are mixed with a vapor of chemically different composition and the forces in step (e) are acting between said vapor and the excited isotope molecule.

28. The method as defined in claim 23 wherein the isotopes are atoms.

29. The method as defined in claim 28 wherein the isotope atoms are mixed with a vapor of chemically different composition and the forces in step (e) are acting between said vapor and the excited isotope.

30. Apparatus for the separation of isotopes of a material including a first isotope and a second isotope, the apparatus comprising a. means for forming a stream of vapor containing said isotopes, said vapor having a velocity in the direction of said stream;

b. means for selectively exciting one of said isotopes by exposing said vapor to radiation at a predetermined wavelength without substantially exciting the second isotope;

c. means for providing the excited first isotope with an excess velocity component transverse to the velocity of said stream by the action of at least one of the processes of molecular dissociation, chemical reaction and inelastic collision with another particle; and d. means for separating the vapor containing the isotope energized in step (c) from the gas remaining in the stream, after a sufficient time to allow the energized isotope to be substanially segregated from the stream by its excess transverse velocity.

31. Apparatus for the separation of isotopes of a material containing a first isotope and a second isotope the apparatus comprising a. means for forming a first stream of vapor containing said isotopes, said vapor having a velocity in the direction of said stream charcterized as first vapor;

b. means for surrounding said first stream with a second vapor having similar velocity and in the same direction as said first vapor and having laminar flow with respect to said first vapor to form a second stream, both streams being contained in a duct;

c. means for selectively exciting one of said isotopes by exposing said vapor to radiation at a predetermined wavelength without substantially exciting the second isotope;

d. means for providing the isotope that is selectively excited with an excess velocity component transverse to the velocity of said stream by the action of at least one of the processes of molecular dissociation, chemical reaction and inelastic collision with another particle; and e. means for separating said first stream from the surrounding second stream now containing a substantial fraction of the separated isotopes of said first stream.

32. Apparatus for the separation of isotopes of a material containing a first isotope and a second isotope the apparatus comprising a. means for forming a first stream of vapor containing said isotopes, said vapor having a velocity in the direction of said stream, characterized as first vapor;

b. means for surrounding said first stream with a second vapor having similar velocity and in the same direction as said first vapor and having laminar flow with respect to said first vapor to form a second stream, both streams being contained in a duct;

c. means for passing said first and second vapor through a supersonic nozzle to accelerate them to supersonic velocities and thereby providing a highly collimated, translationally cold first vapor while also preseving its laminar flow with respect to the second vapor;

d. means for selectively exciting one of said isotopes by exposing said vapor to radiation at a predetermined wavelength without substantially exciting the second isotope;

e. means for providing the excited isotope with an excess velocity component transverse to the velocity of said stream by the action of at least one of the processes of molecular dissociation, chemical reaction and inelastic collision with another particle; and f. means for passing the streams through a diffusor that reduces the velocity of the two streams to subsonic velocities and is so constructed that it separates the first stream from the surrounding stream specified in (b), now containing a substantial fraction of the separated isotope.

* * * * *